Patented Dec. 3, 1946

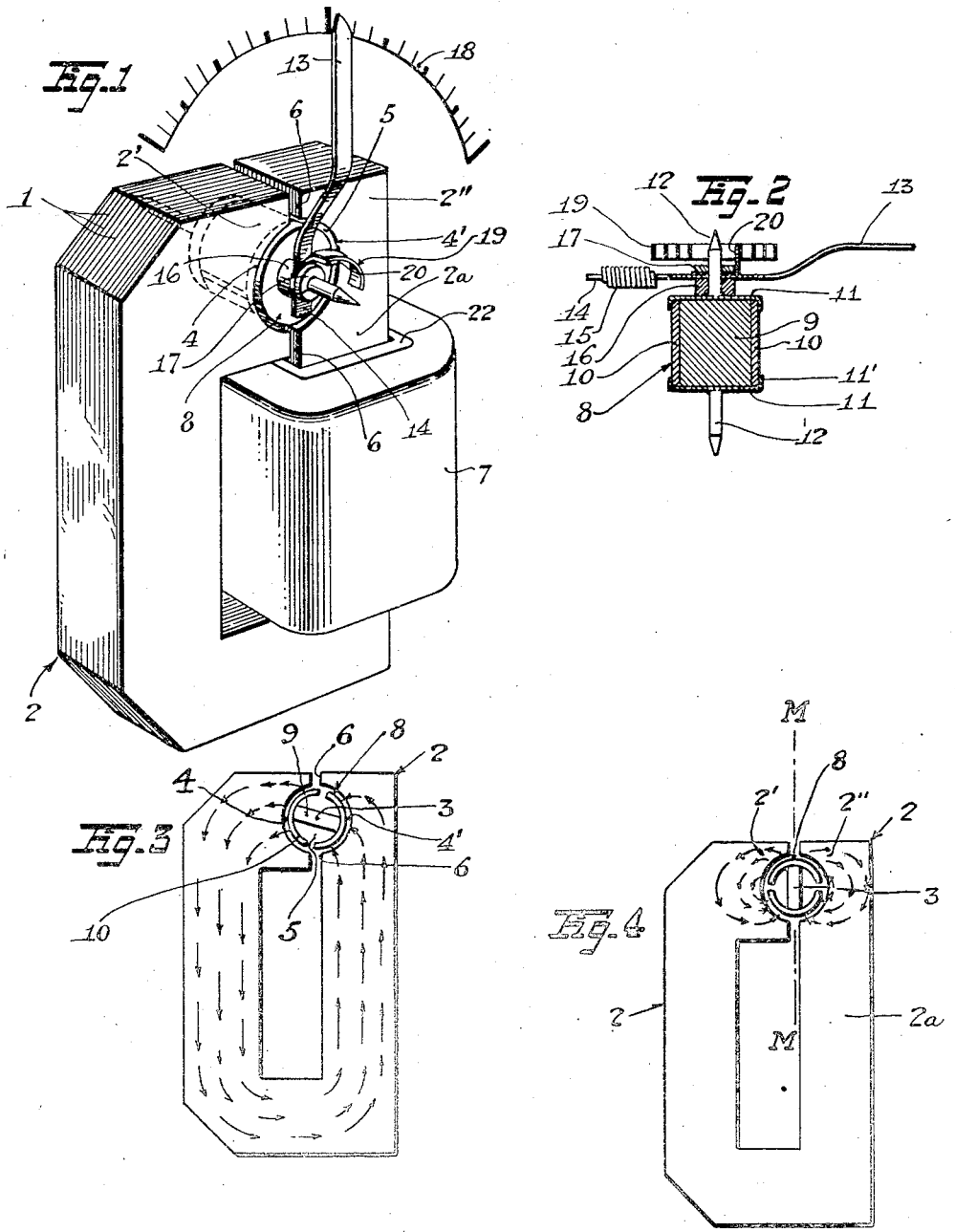

2,411,997

UNITED STATES PATENT OFFICE 2,411,997

METER

Frederick G. Kelly, West Orange, N. J., assignor to Thomas A. Edison, Incorporated, West Orange, N. J., a corporation of New Jersey Application December 17, 1942, Serial No. 469,281

10 Claims. (Cl. 171—95)

This invention relates to electrical measuring instruments and more particularly to a meter for measuring direct current.

The invention is concerned with D.-C. meters of the moving magnet type and has for its general objects to provide such D.-C. meters having a high sensitivity and a uniform scale over a long angular range.

A yet further object is to provide a meter fulfilling the above-stated objects which is simple in design and construction and economical to manufacture.

It is another object to provide an improved permanent magnet rotor for meters of the character mentioned, having angularly long pole surfaces which are substantially uniform in pole strength.

It is a further object to employ such a permanent magnet rotor in conjunction with field poles to obtain new and improved results.

Other objects are to provide an improved field core structure for meters and especially one having a reduced reluctance, and to employ such improved field core structure in conjunction with a permanent-magnet rotor to obtain an improved sensitivity in meter operation.

A further object is to effectively damp the rotor electrically in meters of the character mentioned by simple means applied to the field structure of the meter.

Other and allied objects of my invention will more fully appear from the following description and the appended claims.

In the description of my invention reference is had to the accompanying drawing, of which:

Figure 1 is a perspective fractional view of a meter according to my invention;

Figure 2 is a sectional view of the rotor of the meter taken along the magnetic axis of the rotor;

Figure 3 is a diagrammatical view showing the magnet flux distribution in the field core when the rotor is at the left extremity of its scale range; and Figure 4 is a view similar to Figure 3 but showing the magnet flux distribution in the core when the rotor is at a mid-scale position.

The meter illustrative of my invention and shown in the accompanying figures comprises a set of laminations 1 assembled in stacked relation to form a magnetic core 2. This is a substantially rectangular core terminating in a pair of adjacent field poles 2' and 2". The field poles have arcuate recesses in their adjacent sides which are curved about a common center 3 therebetween to form pole faces 4 and 4'. The poles are thus separated by a central cylindrical air space 5 and by narrow diametrically opposite slits or gaps 6 at their adjacent peripheral edges. A magnetic field flux is set up in this space by a coil 7 provided on a leg 2a of the core. At the center 3 there is pivotally held a permanent magnet rotor 8.

In my invention I employ a permanent magnet rotor having arcuate pole surfaces which subtend a wide angle at the center of the rotor and which are substantially equipotential—i. e., uniform in pole strength. In a preferred construction of such rotor there is employed a block-shaped permanent magnet 9 of one of the highly efficient Alnico magnetic materials having a thickness dimension (axially of the rotor) which is substantially equal to the over-all thickness of the stack of laminations forming the core 2, a length sufficient largely to span the distance between the pole faces, and a width which is small relative to its length. The magnet has its magnetic axis parallel to its length dimension just noted, and has its polar end surfaces arcuately shaped. Mounted on these end surfaces are arcuate shoes 10 made of a high-permeability and low-hysteresis material such as of soft iron. These shoes are held to the magnet by non-magnetic caps 11 having rim flanges 11' which embrace the shoes and clamp them tightly to the magnet, the caps being suitably rigidly held to the shoes as by spot welding. Secured to these caps at their centers are spindles 12. These spindles have conical ends or pivots which are to engage suitable jewels, not shown, at the center line 3 to hold the rotor 8 in a position wherein the peripheral surfaces of the shoes 10 confront the pole faces 4 and 4' and are spaced equally and uniformly therefrom.

On one of the spindles 12 there is provided a pointer 13 having a tailpiece 14 on which a weight 15 is adjustably mounted for counterbalancing the weight of the pointer. This pointer is spaced from the adjacent cap 11 by a washer 16 and is clamped to the spindle against the washer 16 by a split locking washer 17. The pointer 13 moves across a calibrated scale 18 to indicate the values of the quantity being measured. A restoring force is applied to the rotor by a small helical spring 19. This spring may be anchored at its outer end to any suitably stationary part of the meter, not shown, and is anchored at its inner end to a lug 20 that is clamped between the hub of the pointer and the locking washer 17.

Merely to simplify the description, the pointer is here shown as being in line with the magnetic axis of the magnet 9. Upon energization of the coil 7 there will be set up a flux field between the poles of the magnetic core 2. This flux field will flow across from one pole to the other and will have one or another of two possible directions depending upon the direction of the current in the field coil 7. In response to the flux field set up by a current flow in the coil 7, the rotor will seek a position wherein its magnetic axis will be in line and additive with the field flux, with the north and south poles of the rotor being respectively directly adjacent the south and north poles of the core. In the present meter the rotor is biased out of such seeking position into a neutral position by the restoring spring 19 abovementioned, and is propelled toward that position according to the value of current fed to the coil 7, the amount of deflection of the rotor from neutral position being a measure of the value of that current. This neutral position may be one wherein the pointer registers with any suitable point on the scale. When the neutral position is chosen at an intermediate point of the scale, the deflections in opposite directions from that point will be in response to plus and minus values of current in the coil. In the present instance, however, the neutral position is considered as being at the left extremity of the scale, and all readings of the meter are accordingly of the same sign. While the present meter is considered as measuring the current in the field coil 7, it will be understood that that coil current may be supplied as a function of another quantity and that the scale may then be calibrated directly in terms of that quantity.

The desirable characteristics for a meter are a long scale in angular degrees, a uniform scale sometimes referred to as a linear scale, and a high sensitivity. In the present moving magnet meter, these desirable characteristics are attained to an unusually high degree. This is accomplished by providing the moving magnet with pole surfaces which have substantially uniform pole strength and which subtend large angles at the rotor pivot axis, as is aforedescribed, and by providing a field core having very small reluctance.

The criteria for a uniform scale distribution within a given range are (1) that when the field coil is not energized the rotor shall not be attracted magnetically to any one angular position in preference to another but shall, when not mechanically biased, float freely within that range, and (2) the linkage of the magnet flux with the field coil shall vary linearly with angular deflection of the rotor within that range. The first criterion mentioned establishes that the total flux of the rotor magnet shall not vary with angular positioning of the rotor; while, in practice, some variation in total flux is permitted, the permissible variation becomes stringently small for highly sensitive meters. Since the present rotor construction has substantially equipotential pole surfaces, the total magnet flux will remain fixed so long as the effective reluctance of the return paths taken by the magnet flux in going from one magnet pole to the other remains substantially constant. For purposes of analysis, this effective reluctance may be considered as comprising two components: a component representing the reluctance of the air gap between the magnet shoes 10 and the field poles, and a component representing the reluctance which the magnet flux encounters in the field core itself, these two components being hereinafter referred to as the air-gap reluctance and the core reluctance.

Before considering these reluctances it should be clearly borne in mind that the operative angular range of the rotor is from a position wherein the magnet flux is at least partially aligned with and opposed to the field flux to a position wherein the magnet flux is again at least partially aligned with but aiding the field flux, these being positions wherein the rotor magnet axis is displaced plus and minus by a given angle from the medial plane M—M between the field poles as is shown in Figure 4. In the present meter the air-gap reluctance is kept constant through such range by providing the rotor with shoes that are arcuate about the rotor axis and peripherally long to span the slits 6 at all positions of the rotor within that range. That this expedient will so hold the air-gap reluctance constant is readily understood for so long as the air slits 6 are so spanned the width of the air gap between each shoe 10 of the rotor and the field poles—which is the dimension of the gap along the periphery of the rotor—will have the fixed value equal to the peripheral length of the shoe less that of one of the slits 6, it being understood that the other dimensions of each air gap are of course fixed in the present structure. A prerequisite for a long linear scale for the meter is therefore that the rotor not only have substantially equipotential surfaces subtending a large angle at the pivot axis, but that the spacing between the field poles at the sides of the pole faces—which is the peripheral length of the slits 6—shall subtend relatively small angles at that pivot axis. In practice, the separations between the ends of the shoes 10 should not be substantially less than the clearance between the shoes and pole faces, but the peripheral length of the slits 6 may be very small, as small as will there yet produce an air-gap reluctance which is large relative to the reluctance of the field core. When a continuous field core made of a high-permeability material is used, these slits need be only a few thousandths inch long. As typical physical dimensions, however, the shoes 10 may each have an angular length of 165°, with 15° separations at the ends; and the air slits 6 may each have a peripheral length sufficient to subtend 15° at the pivot axis. For these values, the shoes 10 will span the air slits over a 150° range of deflection of the rotor, which is a range of traversal of the rotor magnetic axis over 75° plus and minus from the aforementioned medial plane between the field poles. This, it will be understood, is the maximum range of the rotor, for the particular physical dimensions noted, in which the air-gap reluctance will remain substantially constant.

When the rotor is at the left extremity of the scale just mentioned, substantially all of the magnet flux will take a return path through the entire length of the field core as is indicated in Figure 3. As the rotor is moved clockwise from the left extremity of the scale, more and more of the magnet flux will become localized in the field pole portions, all of the flux becoming there localized and none of it passing through the length of the field core when the rotor reaches a mid-position relative to the scale, as is shown in Figure 4. For further clockwise rotation of the rotor, more and more of the magnet flux will again flow through the field core so that substantially all of it will take a return path through the length of the core when the rotor reaches the right extremity of the scale, but the direction of flow of the flux in the field core will be now reversed from that which it had when the rotor was at the left extremity of the scale.

It is only the flux flowing through the length of the field core that links or threads the winding of the field coil 7. Since in the present meter the rotor has substantially equipotential pole surfaces and spans the air slits 6 continuously within the 150° operative range above noted, the linkage of the magnet flux with the field coil within this range will vary substantially linearly with angular deflection of the rotor. The second criterion above noted for uniform scale distribution is therefore fulfilled. That such linear variation of magnet-flux linkage with the field coil will produce a linear scale distribution will be understood by considering the torque developed by the rotor in response to the field coil current. The equation expressing this developed torque is $$T = KNI\frac{d\phi}{d\theta}$$

Where $T$ is the developed torque, $K$ is a constant, $N$ is the number of turns in the field coil, $I$ is the current in the field coil being measured, $\phi$ is the magnet flux threading the field coil and $\theta$ is the angular deflection of the rotor. When the flux $\phi$ varies linearly with angular deflection of the rotor, as is above noted, the derivative of that flux with respect to the angular deflection of the rotor $$\frac{d\phi}{d\theta}$$

is a constant. The torque thus becomes directly proportionate to the current $I$ in the coil. Since the restoring torque of the spring 19 is proportional to the angle $\theta$, the rotor deflections become directly proportionate to the coil current to give a uniform scale distribution.

It is noted that the magnet flux threading the field coil reaches maximum values in opposite directions when the rotor is at the scale extremities, and passes through a zero value when the rotor is at the middle of the scale. The greater these maximum values become, the greater will be the factor $$\frac{d\phi}{d\theta}$$

and the greater therefore will be the sensitivity of the meter—i. e., the torque developed by a given field coil current. I have found that while the physical dimensions of the rotor and of the air gap between the rotor and field poles are important factors in determining the sensitivity of the meter, it is the absolute value of the reluctance of the field core which is a prime determining factor. In the present meter I have employed a field core construction having a very small reluctance. This low value of reluctance is attained by the use of laminations 1 which are made of a material having a high permeability of the order of 15,000 gauss per oersted or more, such as that known commercially as Mumetal, and extended continuously through the full length of the field core. Preferably in this field core construction, I provide one field pole as a straight extension of the leg 2a of the core. This permits the coil to be prewound by machine methods and the laminations to be thereafter inserted individually into the coil by first springing the leg thereof corresponding to the leg 2a of the core to the side as each lamination is passed through the coil.

For damping the movement of the rotor, a short is provided around the core 2. This short may comprise a copper sleeve 22 surrounding the leg 2a aforementioned, and may conveniently form a base onto which the coil 7 may be wound. The damping action of this sleeve follows as a result of the change in value of magnet flux through the core with change in angular positioning of the magnet, for each such change in flux will induce a current into the copper sleeve about the leg 2a of the core, and this current will produce a magnet flux in the core opposing the flux change and tending thus to damp the movement of the rotor.

The improved sensitivity realized in using a continuous field core construction made of Mumetal may be understood by considering a typical set of characteristics for a preferred construction of my meter, and then considering the effect on the operating characteristics of the meter when a field core is used having a joint therein forming a small air gap.

A typical set of physical and electric characteristics for the present meter may be approximately as follows: the Alnico magnet 9 may be .16″ long x .187″ thick x .032″ wide; the rotor shoes 10 may be .01″ thick (in the direction radial of the rotor) by .187″ wide (in the directions axial of the rotor); the clearance between the shoes 10 and the pole faces may be .03″; the cross-sectional area of the field core may be .5 sq. cm. (.312″ x .25″) and the core may have a mean magnetic path approximately 5 cm. long; and, as for the electrical characteristics, the coil 7 may have 1,000 turns, the magnet may have a total flux of 180 lines, producing a maximum flux density in the core of 360 gauss, and the permeability of the Mumetal at this density may be 30,000.

In the meter above described, there is a torque of .5 g. mm. exerted on the rotor in response to only 2.9 ma. current in the field coil 7, this current producing 2.9 amp. turns for the present coil. In the present design, the power input into the coil for 2.9 ma. current is approximately 50 mu w. By proper choice of restoring spring 19 the torque of .5 g. mm. is utilized to produce a full-scale deflection of 150°. I find that the scale calibration over this range is well-nigh perfectly uniform.

The high sensitivity of the present meter follows as a result of the very low loss which is obtained in the field core. It has been noted that a rotor deflection from one scale extremity to mid-scale position is accompanied by a change in magnet flux in the field coil to the extent of 180 lines, which is the total magnet flux. Each change in magnet flux through the field core with deflection represents a magnetomotive force loss in the meter system equal to the magnetomotive force drop which an amount of flux of the value of that change would have in the field core. This magnetomotive force loss must be supplied by the field coil, and will for any given meter be a fixed precentage of the amp. turns provided by the field coil since the magnet flux change in the field core is in direct proportion with the deflection of the rotor. In the present meter 1.45 amp. turns in the field coil produces a half-scale deflection. The magnetomotive force loss at half-scale deflection, which is that equal to the drop of 180 lines in the field core, is found however to be only approximately .05 amp. turns for the present Mumetal core 2. The loss in amp. turns is therefore in the ratio of $$\frac{.05}{1.45}$$

or only about 3.5%.

Were the field core not continuous along its length but provided with an air gap, the minimum effective length of that gap would be in practice about .0025 cm. even were the laminations interleaved at that gap. The presence of this gap would not materially change the value of magnet flux in the field core since the length of this gap is small relative to that of the air gaps between the field poles and the rotor shoes 10, and we may therefore consider the total magnet flux in the core to be again 180 lines. For a core having .5 sq. cm. cross-sectional area, this gap would have .005 c. g. s. unit of reluctance and would for 180 lines of flux produce a magnetomotive force drop of .72 amp. turns $$\left(\frac{.005 \times 180}{.4\pi}\right)$$

This loss would have to be wholly overcome at mid-scale deflection—since there is a total magnet flux change in the core at that deflection—and thus to obtain a mid-scale deflection there would be required approximately a 50% increase in amp. turns. This means that each deflection would require a 50% increase in amp. turns as a result of the .0025 air gap above presumed.

It will be understood that the present meter may be readily adapted to higher or lower current measurements than that hereinbefore noted. This adaptation is preferably made by using fewer turns of larger wire or more turns of finer wire in the field coil. If a multiple range meter is desired, appropriate taps may be brought out from the field coil. In all ranges, however, there may be utilized the same power of 50 microwatts input for a full-scale deflection. Since in the meter of this invention I do not need to transmit the current under measurement through torsion (hair) springs nor be limited to the delicacies of a moving coil, I may wind the field coil with but one turn having for example only a few millionths of one ohm resistance, or I may wind the coil with many turns having as many as 15,000 ohms resistance. Of course, for intermediate current ranges, there may be used any desirable intermediate values of turns and resistance for the field coil.

The embodiment of my invention herein shown and described is illustrative but not limitative of my invention for the same is subject to changes and modifications without departure from the scope of my invention, which I endeavor to express according to the following claims.

I claim:

1. In a meter of the moving magnet type: the combination of a core of magnetic material continuous throughout the length thereof and terminating in field poles having arcuate pole faces curved about a common center line therebetween and separated by air gaps at their adjacent peripheral edges; a coil associated with said core for producing a magnetic field between said field poles; and a magnet structure pivoted between said pole faces for response to changes in the magnetic flux produced by said coil, said magnet structure having arcuate pole shoes of high permeable material confronting said pole faces, said pole shoes having an angular length sufficient to span the peripheral gaps between said field poles, throughout a substantial angular range.

2. In a meter including a pivoted permanent magnet structure: the combination of laminations assembled in stacked relation and forming a core of magnetic material continuous throughout the length thereof, said core having leg portions terminating in field poles, said poles having arcuate pole faces cooperating with said magnet structure, one of said poles being a straight extension of one leg portion of said core; and a field coil on said one leg portion for producing a magnet field between said pole faces, the leg portions of said laminations being capable of being flexed to the side to permit the laminations to be inserted individually into said coil in the assembling of said meter.

3. A sensitive moving magnet type of direct current measuring instrument adapted to have a uniform scale comprising a field core structure having pole faces arcuate about a common center line therebetween and separated by air gaps at their adjacent peripheral edges, a permanent magnet structure pivoted at said center line and provided with substantially equipotential pole shoes of non-permanent magnetic material having faces uniformly spaced from said field pole faces, the pole faces of said field and magnet structures being wide so that the magnet pole faces will bridge the peripheral gaps between the field pole faces throughout a substantial range and said field core structure being continuous from pole face to pole face and made of a low loss material having a permeability of the order of 15,000 or more, means for pivotally biasing said magnet structure in one direction, and a field coil associated with said core structure for setting up a magnetic flux between said field pole faces to produce a torque influence on said pivoted magnet structure in the other direction.

4. In a meter responsive to continuous current: the combination of a field core having a pair of field poles with adjacent faces curved arcuately about a common center line therebetween and separated by air gaps at their adjacent peripheral edges; a permanent-magnet rotor pivoted at said center line and having diametrically opposite pole shoes of non-permanent magnetic material with arcuate peripheral surfaces of substantially uniform pole strength, each of said rotor poles subtending a multiple times greater angle at said center line than is the angle subtended at said center line by the peripheral gaps between said field poles; means pivotally biasing said rotor in one direction; and a coil associated with said field core energizable by current to be measured for producing a magnetic field between said field poles to deflect said rotor in the other direction.

5. In a meter responsive to continuous current comprising a field core having a pair of field poles with adjacent faces curved arcuately about a common center line therebetween and separated by air gaps at their adjacent peripheral edges: the combination of a permanent-magnet rotor pivoted at said center line and having diametrically opposite pole shoes of non-permanent magnetic material with peripheral surfaces of substantially uniform pole strength, each of said surfaces subtending an angle at said center line which is the major part of a straight angle, said rotor having an operative range wherein the pole surfaces thereof bridge the peripheral gaps between said field poles; means pivotally biasing said rotor into a position within said range; and a coil associated with said field core for receiving current to be measured and producing a magnetic field between said field poles, said rotor being subjected to a torque influence by said magnetic field which is substantially proportional to said current within said range.

6. In a meter responsive to continuous current comprising a field structure having a pair of field poles with adjacent faces curved arcuately about a common center line therebetween and separated by air gaps at their adjacent peripheral edges, and a coil associated with said field structure and energizable by said current for producing a magnetic field between said field poles, each of said poles subtending an angle at said center line which is the major part of a straight angle: a permanent-magnet rotor pivoted at said center line and deflected angularly according to the value of said current within a predetermined range of movement of the rotor, said rotor comprising a magnet symmetrically disposed relative to said center line and having a width which is narrow in comparison to that of said field poles, and further comprising pole shoes of non-permanent magnetic material at the pole ends of said magnet and curved arcuately about said center line, each of said shoes subtending an angle at said center line which is the major part of a straight angle and the surfaces of said shoes being substantially equipotential, said range being that wherein said pole shoes bridge the peripheral gaps between said field poles, and said rotor being biased into a position within said range.

7. In a meter responsive to continuous current: the combination of a field structure comprising field poles having adjacent faces curved arcuately about a common center line therebetween and separated by air gaps at their adjacent peripheral edges; a permanent-magnet rotor pivoted at said center line and having opposite pole shoes of non-permanent magnetic material with substantially equipotential pole surfaces arcuately disposed about said center line, the peripheral spacing between said rotor poles being of the order of the magnitude of the length of air gap between the rotor poles and said field poles, said rotor having an operative range wherein the poles thereof bridge the peripheral gaps between said field poles; means for biasing said rotor into a position within said range; and a coil, associated with said field structure and energizable by the current to be measured, for producing a magnetic field between said field poles to deflect the rotor out of its biased position.

8. In a meter adapted to measure continuous current according to a uniform scale: the combination of a field core having a pair of field poles with adjacent faces curved arcuately about a common center line therebetween, and a coil associated with said core for receiving current to be measured; and a rotor pivoted at said center line and comprising a permanent magnet having arcuate pole shoes of high permeable material at the polar ends of the magnet and bridging the peripheral gaps between the field poles throughout a range of pivotal movement of the rotor, said rotor producing a magnetic flux in said core through said coil which varies substantially linearly with angular deflection of the rotor through said range, and means for producing a biasing torque on said rotor which varies substantially linearly with reflection of the rotor through said range.

9. In a meter of the moving-magnet type: the combination of a field-core structure terminating in a pair of field poles having concave pole faces at their adjacent sides and separated by air gaps at their edges; a coil associated with said core structure for producing a magnetic field between said pole faces; and a pivoted magnet structure between said pole faces and responsive to changes in intensity of the magnetic field produced by said coil, said magnet structure comprising a permanent-magnet member magnetized transversely to its pivot axis and curved non-permanent pole shoes associated with the pole end faces of said magnet member and confronting the pole faces of said field core, said pole shoes spanning said air gaps continuously within the operative range of said pivoted magnet structure.

10. In a meter of the moving-magnet type: the combination of a core of magnetic material terminating in field poles, said field poles having pole faces curved arcuately about a common center line therebetween and separated by air gaps at their adjacent peripheral edges; a coil associated with said core for producing a magnetic field between said pole faces; and a pivoted permanent magnet rotor between said pole faces characterized as being substantially without magnetic bias within a given deflection range thereof, said rotor comprising substantially equipotential pole shoes of non-permanent magnetic material having faces spaced uniformly from said field pole faces, said rotor pole faces bridging the peripheral gaps between said field pole faces throughout said deflection range.

FREDERICK G. KELLY.